United States Patent [19]

Staiger et al.

[11] 4,336,823

[45] Jun. 29, 1982

[54] SOLENOID VALVE

[75] Inventors: Bruno F. Staiger, Erligheim; Kurt Stoll, Esslingen, both of Fed. Rep. of Germany

[73] Assignee: Festo-Maschinenfabrik Gottlieb Stoll, Esslingen, Fed. Rep. of Germany

[21] Appl. No.: 129,803

[22] Filed: Mar. 12, 1980

[30] Foreign Application Priority Data

Mar. 17, 1979 [DE] Fed. Rep. of Germany ....... 2910660
Aug. 18, 1979 [DE] Fed. Rep. of Germany ....... 2933545

[51] Int. Cl.³ ...................... F16K 31/06; F16K 11/04
[52] U.S. Cl. ............................. 137/270; 137/625.65; 251/139
[58] Field of Search ............... 251/141, 137, 139; 137/625.65, 270

[56] References Cited

U.S. PATENT DOCUMENTS

| | | | |
|---|---|---|---|
| 3,285,285 | 11/1966 | Bielefeld | 137/625.5 |
| 3,383,084 | 5/1968 | Mayfield | 251/137 |
| 3,521,854 | 7/1970 | Leiber et al. | 251/141 X |
| 3,828,818 | 8/1974 | Hunt | 251/139 X |
| 3,878,859 | 4/1975 | Grob et al. | 137/270 |
| 3,921,670 | 11/1975 | Clippard et al. | 137/625.65 |
| 4,114,648 | 9/1978 | Nakajima et al. | 251/137 X |
| 4,196,751 | 4/1980 | Fischer et al. | 251/141 X |

FOREIGN PATENT DOCUMENTS 2303450 8/1974 Fed. Rep. of Germany ...... 251/141

*Primary Examiner*—Arnold Rosenthal
*Attorney, Agent, or Firm*—Blanchard, Flynn, Thiel, Boutell & Tanis

[57] ABSTRACT

A solenoid valve having a valve body and a magnetic head with a chamber arranged between a pair of magnetic cores. A movable armature is provided in the chamber and has a sealing member movable therewith between open and closed positions relative to a passageway through one of the magnet cores. A spring is provided for biasing the armature and, accordingly, the associated sealing member toward one of the two positions thereof. The force of the magnetic field generated by the electrically energizable magnetic coil encircling the magnet cores is greater than the return force of the return spring.

18 Claims, 9 Drawing Figures

SOLENOID VALVE

FIELD OF THE INVENTION

The invention relates to a solenoid valve.

BACKGROUND OF THE INVENTION

A known solenoid valve is of a type comprising a magnetic head, a valve body and a chamber, whose upper boundary on the side of the magnetic head which is remote from the valve body is provided with a magnet core and in which an armature movable against a spring force and carrying a sealing pin with a sealing face for closing a passage is arranged.

The armature, to whose lower end the sealing pin is fitted, is pressed downwards against the valve body by the force of the spring, so that the sealing face of the sealing pin is firmly pressed against the passage orifice, thus closing the passage. In order to open the valve, the magnetic head is energised, creating a magnetic field in which the armature is pulled up towards the core against the spring force. In this way, the sealing face of the sealing pin is lifted off the orifice of the passage, allowing the medium to flow through.

The disadvantage of this solenoid valve lies in the fact that the armature can only be actuated in one direction by way of the magnetic field and that another solenoid valve is required for applications in which the sealing pin is supposed to be lifted off the orifice by the spring when no voltage is being applied, while being pressed against the orifice to close the valve as soon as the magnetic field is switched on. This arrangement necessitates extensive spares storage, since different solenoid valves are required for the opposing control functions, and if the direction of control is reversed as a result of subsequent changes in operating methods, a completely new valve has to be installed.

The present invention is aimed at obviating or mitigating the disadvantages outlined above and at creating a solenoid valve of the type described, which can be adapted to perform closing and opening functions in opposite directions without requiring additional control components.

According to the present invention there is provided a solenoid valve comprising a valve body and a magnetic head, a chamber arranged within the confines of the magnetic head and having a pair of opposite sides defined by respective magnet cores, an armature movable in the chamber and mounting a sealing member with a pair of opposed sealing faces for closing a communication between the chamber and respective passages, and means biassing the armature in one direction of movement towards one of the magnet cores, a spacing between the armature and the other of the magnet cores being less than the spacing between the armature and said one magnet core.

This arrangement offers the advantage of alternative options, since the solenoid valve may either be operated in a "de-energised closed" mode or else in a "de-energised open" mode. When operating in the "de-energised closed" mode, the sealing face of the sealing pin is firmly pressed against the orifice of the passage in the lower magnet core by spring action. As the distance between the armature and the upper magnet core remote from the orifice is shorter than the distance between the armature and the second, lower magnet core, the armature is pulled upwards against the force of the spring, as soon as the current flows across the magnetic field, thus lifting the sealing pin and opening the passage. For applications in the "de-energised open" mode, the control assembly consisting of armature, sealing pin and spring is simply turned by 180° within the chamber, so that the other sealing face of the sealing pin is now facing the passage orifice and the sealing pin is lifted off the orifice by the spring. In this case, the armature is closer to the lower, second magnet core than to the opposing upper magnet core. When current is introduced, the armature is pulled towards the lower magnet core against spring action by the magnetic field, firmly pressing the sealing pin against the passage orifice in order to check the flow of the medium. In this way, the control mode can be reversed in an extremely simple way without involving any additional components, thus permitting a significantly smaller quantity of parts to be stocked and the solenoid valve to be adapted to subsequent changes in operating methods.

In order to eliminate the possibility of the magnetic force being adversely affected in the larger air space as a result of air gap induction on that side of the armature which faces the associated magnet core across the larger distance, which might make it impossible to ensure a perfect control function in certain cases involving extremely high efficiency requirements, a preferred embodiment of the invention provides for a short-circuit section which connects the armature to the more distant magnet core. This arrangement offers the advantage of magnetically short-circuiting the air gap between armature and magnet core. This magnetic short-circuit virtually reduces induction on this side of the armature to zero, so that there is no development of magnetic force. When the magnetic head is energised, the buildup of magnetic induction is therefore limited to the other side of the armature, which, unaffected by opposing magnetic forces, is able to function efficiently, and the armature is pulled powerfully in one direction only towards the core concerned. This provides for high efficiency and ensures reliable functioning even in operating conditions which require a very high performance.

BRIEF DESCRIPTION OF THE DRAWINGS

Embodiments of the invention will now be described by way of example only with reference to the accompanying drawings, in which.

DETAILED DESCRIPTION

Figure 1:
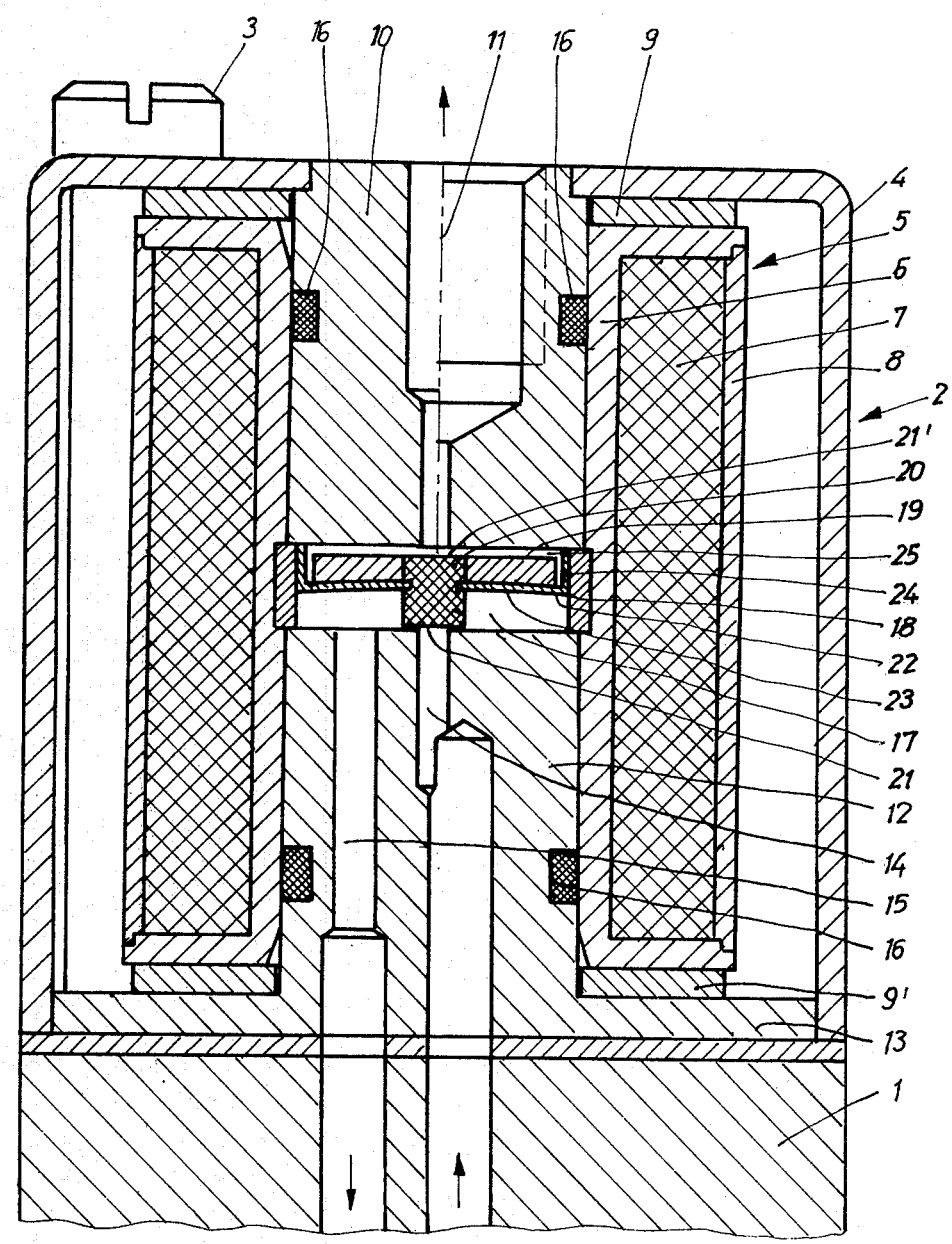
FIG. 1 shows part of a first embodiment of a solenoid valve in section.

To a valve body 1 of a solenoid valve illustrated in FIG. 1, a magnetic head 2 is attached by a screw 3, a gasket being inserted between the valve body 1 and the magnetic head 2. The magnetic head 2 has a housing 4, in which a magnet coil 5 is arranged, this coil comprising a coil body 6, a coil winding 7 and an insulating sheath 8, and having flux discs 9, 9' at respective ends. The coil body 6 contains a first magnet core 10 arranged in a top part of the magnetic head 2 remote from the valve body 1 and having a vent hole 11, and a second magnet core 12 arranged in a lower part of the magnetic head 2 adjacent to the valve body 1 and having a flange 13, a passage 14 and a bore 15 through which operating medium can flow. A seal between the circumference of the magnet cores 10 and 12 respectively and the coil body 6 is provided by sealing rings 16.

Between the two magnet cores 10, 12 a chamber 17 is arranged in the centre of the coil 5, the circumference of which chamber is bounded by a spacer 18 maintaining the distance between the magnet cores 10, 12, the upper boundary being defined by the magnet core 10 and the lower boundary being defined by the magnet core 12. In this way, the chamber is arranged in the centre of the magnetic field with reference to the direction of armature movement. With its magnet cores being of essentially equal size, this arrangement ensures that, independent of the position of a control assembly yet to be described in the chamber, the forces acting on the armature when the current is switched on are equal, so that an armature is pulled towards the magnet core 10 with the same amount of magnetic force in a "de-energised closed" mode, as it is pulled towards the magnet core 12 in a "de-energised open" mode.

The height of the chamber 17 is, by about a third, less than the diameter of the chamber 17. In the chamber 17 is arranged a control assembly comprising an armature 19 designed as a flat disc, a sealing pin 20 with sealing faces 21, 21' and a spring 22 having a base 23 and a cylindrical wall segment 24 and being of a cup-shaped design.

Since the height of the chamber, in relation to the direction of movement of the armature, is suitably designed smaller than in the transverse direction and since the armature is designed as a flat disc, a compact design is achieved, in which the armature, the sealing pin and the spring are arranged in a small and correspondingly space-saving manner.

The armature 19 is mounted in the cup-shaped spring 22, being joined to the latter, and the wall segment 24, which rests against the upper magnet core 10, projects above the armature 19 to provide for a small distance 25 between the armature 19 and the upper magnet core 10.

Since the spring 22 is cup-shaped, having a base 23 and a wall segment 24 higher than the thickness of the armature 19, the latter is cupped by the spring 22 and surmounted by its wall segment 24, which rests against the magnet core to which it is adjacent.

It can be further seen that the sealing pin 20 is positively moulded into a hole in the centre of the base 23, so that the control assembly forms a unit and a hard elastic material can be used for the sealing pin, since any counterforces transmitted to the sealing pin via the sealing faces are directly absorbed by the spring 22.

The distance between the armature 19 and the lower magnet core 12 is substantially larger than the distance 25 between the armature 19 and the upper magnet core 10.

FIG. 1 illustrates the "de-energised closed" mode, the sealing pin 20 with its sealing face 21 closing the passage 14 under the force of the spring 22. When the current is switched on, the coil 5 creates a magnetic field across the magnet cores 10, 12 and the armature 19, owing to its short distance from the magnet core 10, is pulled towards the upper magnet core 10 against the force of the spring 22. The sealing face 21 is now lifted off the orifice of the passage 14, and the medium can flow into the bore 15 by way of the chamber 17.

Figures 2A, 2B:
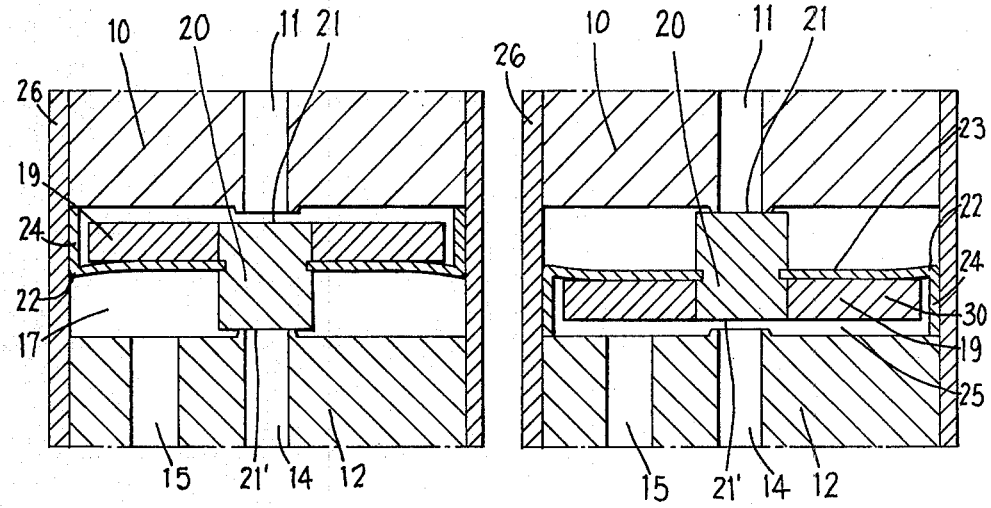
FIG. 2A and FIG. 2B are each an enlarged view of the control assembly of the solenoid valve illustrated in FIG. 1, FIG. 2B being an alternative embodiment.

FIG. 2A illustrates the upper magnet core 10 and the lower magnet core 12 arranged in a guide tube 26, which at the same time forms the peripheral boundary of the chamber 17. The control assembly in the chamber 17 is divided into two sections, each illustrating one of the two control modes. The control assembly as viewed in FIG. 2A represents the "de-energised closed" position and corresponds to the control mode illustrated in FIG. 1. The control assembly as viewed in FIG. 2B, on the other hand, corresponds to a "de-energised open" mode. The control mode of the solenoid valve can be reversed simply by opening the magnetic head 2 and turning the control assembly in the chamber 17 by 180°, so that the wall segment 24 of the spring 22 now rests against the lower magnet core 12 and the short distance 25 now lies between the armature 19 and the lower magnet core 12, the sealing face 21' being in a raised position above the orifice of the passage 14. When the unit is energised, the short distance 25 permits the armature 19 to be pulled downwards towards the magnet core 12 against the force of the spring 22, so that the sealing face 21' of the sealing pin 20 is pressed on the orifice of the passage 14, thus checking the flow of the medium.

Figure 3:
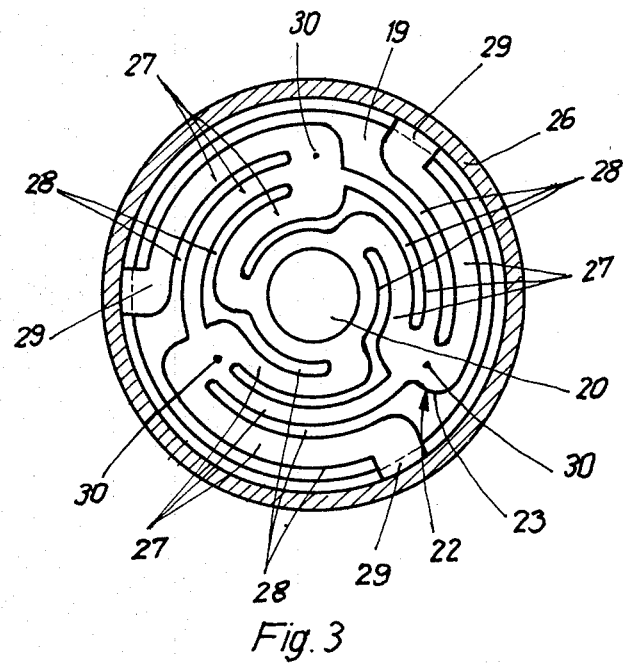
FIG. 3 is a plan view of a spring of the control assembly illustrated in FIG. 2.

As can be seen in FIG. 3, the base of the spring 22 is provided with segmental webs 27 interspersed with equally segmental narrow slots 28. Several spring webs 27 are arranged parallel to each other, providing for a long course with high elasticity. Since the spring base 23 is thus provided with spring webs interspersed with slots, the elasticity of the spring 22 is significantly raised, the slots 28 breaking the rigidity of the base 23 and the webs 27 being capable of absorbing a higher degree of deformation. Owing to the segmental arrangement of the spring webs and the slots, a long course is achieved in a direction normal to the plane of the base.

The wall segment 24 is provided by spring sections 29 formed by bending the free ends of the spring webs 27, there being a total of three such sections 29 arranged at equal distances around the circumference of the base 23. In three points 30, the spring 22 is joined to the armature 19 by extremely delicately executed laser beam welding. Since the wall segment 24 is formed by bending the end sections 29 of the spring base 23, it is not only possible to avoid the risks of material cracks and deformation which would be involved in pressing-/bending a spring with a continous wall segment, but also to achieve a more elastic spring behaviour.

The use of only three of these sections 29 equally spaced around the circumference of the base 23 is to be specially recommended, since the three-point support achieved by this arrangement would ensure an even, non-wobbly seat for the spring 22. Since the spring 22 is joined to the armature 19, these components form a unit, in which the armature 19 supported in the cup-shaped spring 22 is pulled away from the corresponding magnet core by the force of the spring to which it is joined, as long as the current remains switched off, whilst bending the spring towards the corresponding magnet core by way of the joint when the magnetic field is switched on, thus creating a spring force which will allow the spring to return into its original position when the magnetic field is switched off again. Laser beam welding ensures high strength in extremely small point welds.

Figures 4A, 4B:
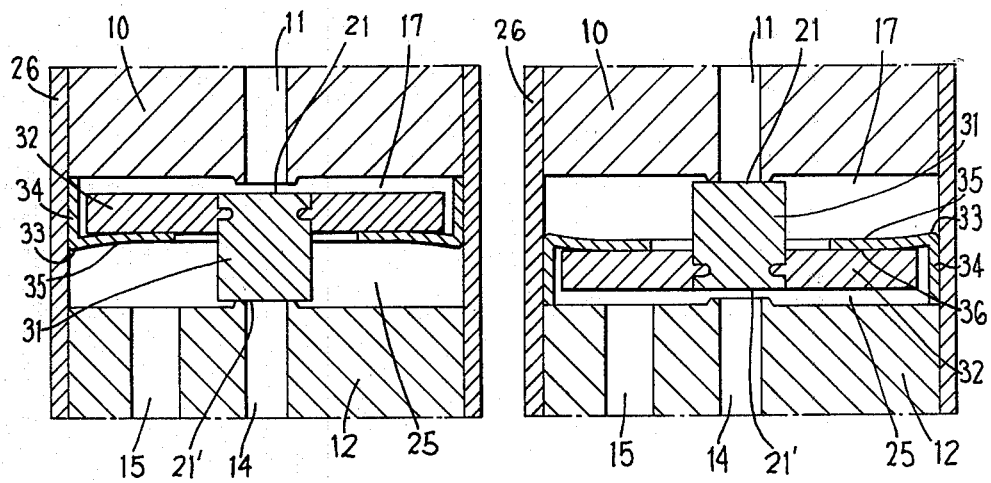
FIG. 4A and FIG. 4B are each an enlarged view of an alternative control assembly of the solenoid valve illustrated in FIG. 1, FIG. 4B being an alternative embodiment.

Similar to the embodiment illustrated in FIGS. 2A and 2B, FIG. 4A shows the control assembly in the "de-energised closed" mode and FIG. 4B illustrates the "de-energised open" mode. In this case, however, a sealing pin 31 is positively moulded into a central bore of an armature 32, the sealing pin preferably consisting of a soft, highly elastic material. A cup-shaped spring 33 comprises a base 35 and a cylindrical wall segment 34, but the base 35 has a larger central bore, and the spring is joined to the armature 32 by laser beam welds 36 only.

Figure 5:
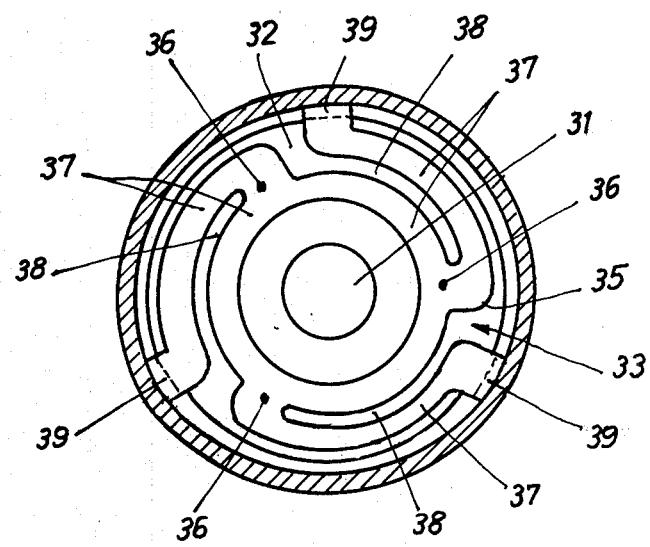
FIG. 5 is a plan view of a spring of the control assembly illustrated in FIG. 4.

As can be seen in FIG. 5, the base 35 of the spring 33 is also provided with segmental spring webs 37 interspersed with narrow slots 38. The course of the spring webs 37 is, however, shorter, and to compensate for the corresponding loss of elasticity, the sealing pin 31 is advantageously made of a softer material. The wall segment 34 in this embodiment of the spring 33 is also made up of three spring sections 39, which are arranged at equal distance around the circumference of the base 35 and are formed by bending free ends of the spring webs 37.

Figure 6:
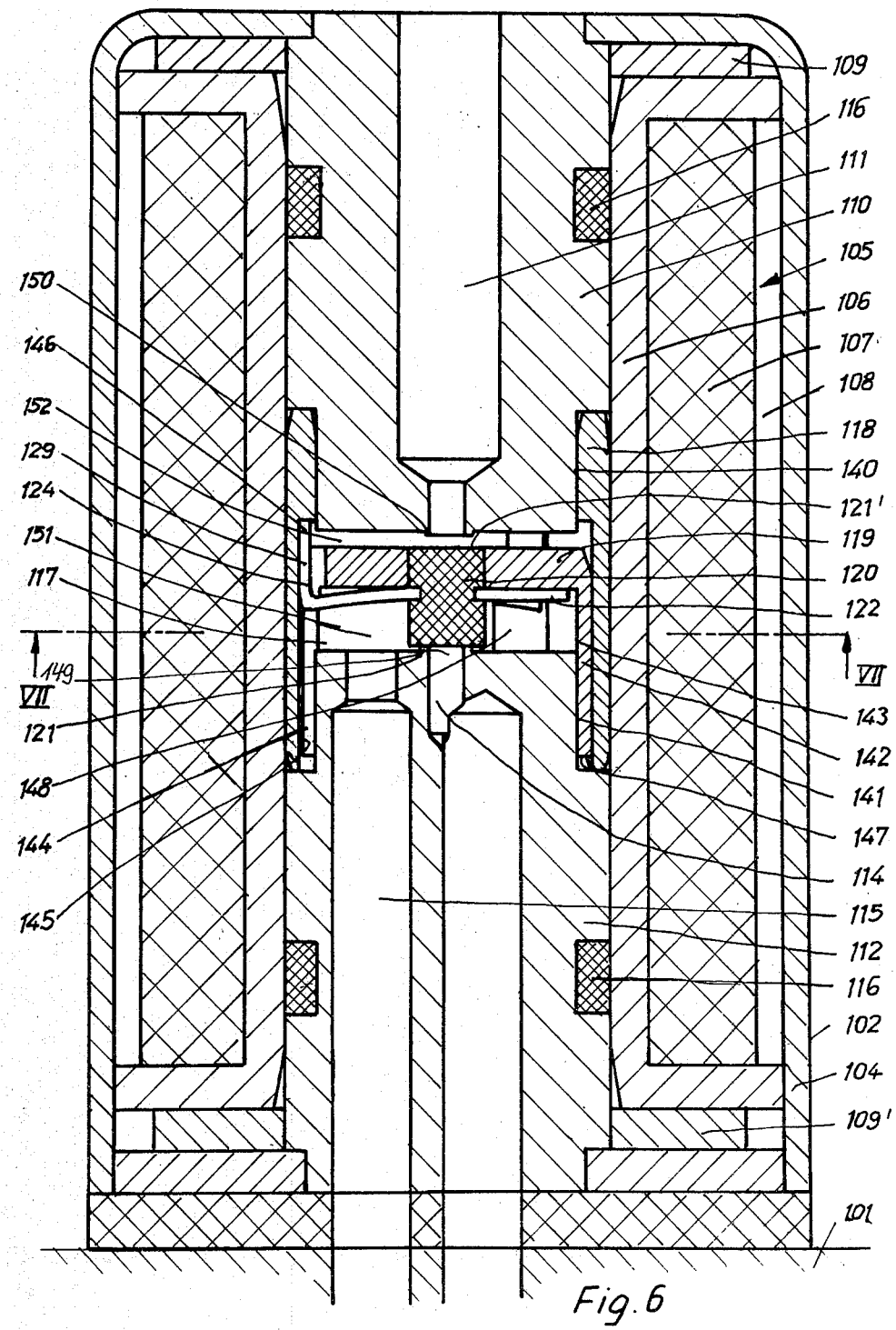
FIG. 6 is a lateral section through part of a second embodiment of a solenoid valve.
Figure 7:
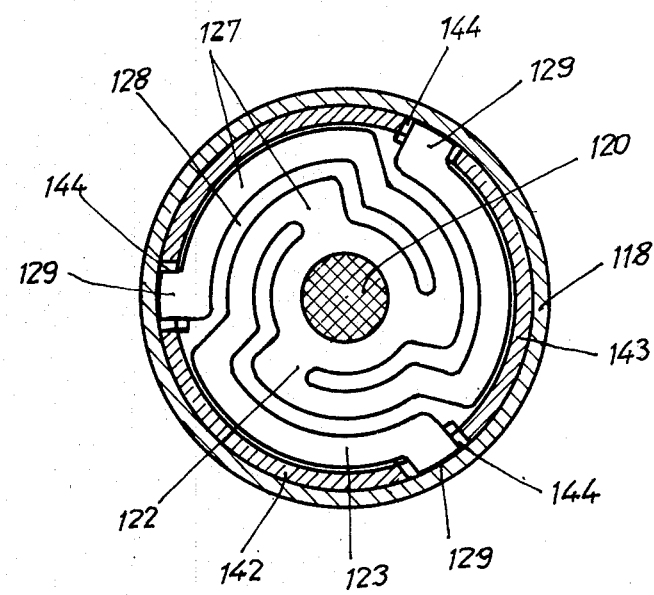
FIG. 7 is a section through part of the magnetic head along the line VII—VII in FIG. 6.

The embodiment illustrated in FIGS. 6 and 7 is also a solenoid valve comprising a valve body 101 and a magnetic head 102. The magnetic head 102 has a housing 104, in which is arranged a coil 105 comprising a coil body 106, a coil winding 107 an insulating sheath 108, and flux discs 109, 109' at respective ends. The coil body 106 contains an upper magnet core 110 with a vent hole 111 and, close to the valve body 101, a lower magnet core 112 with a passage 114 and a bore 115 for operating medium. The external shape of the magnet cores 110, 112 is perfectly identical, thus permitting economy in manufacture. A seal between the circumferences of the magnet cores 110, 112 and the coil body 106 is provided by sealing rings 116.

Between the magnet cores 110, 112, a chamber 117 is arranged, whose circumference is bounded by a guide bush 118. The guide bush 118 is arranged in peripheral recesses 140, 141 of the magnet cores 110, 112 and maintains their axial spacing.

In the chamber 117 is arranged a control assembly comprising an armature 119, a sealing pin 120 and a disc-shaped spring 122, the spring consisting of a base 123 and three end sections 129 forming a cylindrical wall segment 124. The base is provided with segmental spring webs 127 interspersed with slots 128.

The armature 119 is designed in the shape of a cup and has a magnetic short circuit component 142, which forms a single-piece unit with the armature 119 and is represented by a circular cup wall 143. The circular cup wall 143 is provided with three cutouts 144 in the shape of longitudinal slots, in which the spring end sections 129 are inserted.

The inside of the guide bush 118 is provided with a bore 145 extending over part of its length, which bore serves to receive the spring end sections 129 on the one hand and the circular cup wall 143 on the other hand. The arrangement is such that the free ends 146 of the spring sections 129 are facing the upper magnet core 110, while an edge 147 of the circular cup wall 143 is facing in the opposite direction, being turned towards the lower magnet core 112.

In the area of the recess 141, the circular cup wall 143 positively overlaps the lower magnet core 112, being mounted in a sliding fit arrangement in the guide bush 118. The clearance between the circular cup wall 143 and the lower magnet core 112 and the clearance between the circular cup wall 143 and the guide bush 118 are so small that a precise, loss-free and low-friction sliding guidance is ensured in the axial direction.

The sealing pin 120 with sealing faces 121, 121' is joined to the armature 119, its major part protruding into the cup space 148. Within the cup space 148, the spring 122 is firmly joined to the armature 119 attached to the sealing pin 120.

In the embodiment illustrated, the sealing face 121 of the sealing pin 120 is pressed firmly onto a valve seat 149 of the lower magnet core 112 by the force of the spring 122, thus checking the flow of the medium. When the magnetic head 102 is energised, the armature 119 is pulled towards the upper magnet core 110 against the force of the spring 122, which releases the valve seat 149 for the medium flow, while the sealing face 121' of the sealing bolt 120 now blocks the vent hole 111 at a valve seat 150 of the upper magnet core 110. The magnetic short-circuit component 142 represented by the circular cup wall 143 short-circuits an air gap 151 between the armature 119 and the lower magnet core 112, thus preventing induction in the air gap 151. The induction generated in an opposite narrow air gap 152 and the resulting force acting between the armature 119 and the upper magnet core 110 are, however, very strong, thus ensuring a perfect and highly efficient switching function.

As can be seen clearly in the drawing, the switching function of the solenoid valve can be reversed by simply reversing the guide bush 118 and the control assembly comprising the armature 119, the sealing pin 120 and the spring 122, which ensures great versatility of application. In this case, the magnetic short-circuit component 142 overlaps the upper magnet core 110, the sealing face 121' is facing the valve seat 150 and the armature 119 is pulled towards the lower magnet core 112.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A solenoid valve for use on a body having an inlet port and an outlet port, comprising:
   a pair of magnet cores axially spaced to define a chamber therebetween, one of said magnet cores having a pair of axially extending passageways therethrough each providing fluid communication between a respective one of said inlet and outlet ports and said chamber;
   an electrically energizable magnet coil encircling said pair of magnet cores, the magnetic field generated by the energization of said magnet coil passing across said chamber;
   valve means mounted in said chamber, said valve means including a magnetic armature reciprocably mounted in said chamber and being movable toward one of said magnet cores in response to an energization of said magnet coil, a sealing member and a return spring, said sealing member being secured for movement with said armature and being movable between first and second positions, said first position being a sealing engagement with the end of one of said passageways entering said chamber, said second position being spaced from said one end, said return spring biassing said sealing member into one of said first and second positions;

spacer means supporting said valve means being removably mounted in said chamber; and means for providing access to said chamber to facilitate the removal of said spacer means and said valve means supported thereon therefrom so that said spacer means and said valve means can be turned over through 180° and reinserted into said chamber to thereby orient said sealing member at the other of said first and second positions, the magnetic force of said magnetic field sufficiently stronger than the return force of said return spring.

2. A solenoid valve in accordance with claim 1, wherein said chamber is arranged in the axial center of said magnet coil.

3. A solenoid valve in accordance with claim 1 or 2, wherein the dimension of said chamber in the direction of movement of said armature is less than in the transverse direction, and said armature is designed as a flat disc.

4. A solenoid valve in accordance with claim 1, wherein said armature is cup-shaped and is mounted in spacer means which is arranged in peripheral recesses in both of said magnet cores.

5. A solenoid valve in accordance with claim 4, wherein said magnet cores having said peripheral recesses thereon are identical in their external shape.

6. A solenoid valve in accordance with claim 4, wherein said return spring is arranged in the cup space of said armature, said return spring having spring end sections formed thereon which are inserted into cutouts in the circular wall of said cup-shaped armature.

7. A solenoid valve in accordance with claim 6, wherein said free end sections of said return spring face one of said magnet cores, while a free rim of said circular wall of said armature faces the other of said magnet cores.

8. A solenoid valve in accordance with claim 6, wherein said spacer means is a guide bush having a bore extending over part of its length, which bore receives said circular wall of said armature and said spring end sections.

9. A solenoid valve in accordance with claim 1, wherein said sealing member is arranged in the cup space of said return spring.

10. A solenoid valve in accordance with claim 1, wherein said return spring is cup-shaped and has a base and a cylindrical wall segment which has height greater than the thickness of said armature, said wall segment being formed by bending over spring end sections of said base of said return spring at equally spaced intervals around the circumference of said base to define said spacer means.

11. A solenoid valve in accordance with claim 1, wherein said return spring has a base provided with spring webs interspersed with slots, said spring webs and said slots having a segmental shape.

12. A solenoid valve in accordance with claim 11, wherein said return spring is fixed to said armature.

13. A solenoid valve in accordance with claim 12, wherein a joint between said spring webs and said armature is formed by laser beam welding.

14. A solenoid valve in accordance with claim 1, wherein said return spring has a base, and wherein said sealing member is moulded into a central bore in said base and also into a central bore in said armature.

15. A solenoid valve in accordance with claim 1 or 2, wherein said armature is a flat disc.

16. A solenoid valve in accordance with claim 1, wherein said spacer means is a cylindrical ring and wherein said return spring is cup-shaped having a base and a cylindrical wall segment, said wall segment being secured to said ring on the inside thereof, said return spring having said armature and said sealing member mounted thereon and both thereof being movable against the spring return force of said return spring.

17. A solenoid valve in accordance with claim 1, wherein said sealing member is an elongated member having a pair of opposed ends located on opposite sides of said return spring and said armature, one of said ends being located juxtaposed said one passageway.

18. A solenoid valve is accordance with claim 1, including means defining a vent hole on a side of said chamber remote from said one passageway opening into said chamber.

* * * * *